United States Patent [19]
Kataoka et al.

[11] Patent Number: 5,926,242
[45] Date of Patent: Jul. 20, 1999

[54] ACTIVE MATRIX REFLECTIVE GUEST-HOST LCD WITH PIXEL ELECTRODES PATTERNED ON QUARTER WAVE PLATE

[75] Inventors: Hideo Kataoka; Ying Bao Yang; Nobuyuki Shigeno; Tetsuo Urabe; Masaki Munakata, all of Kanagawa, Japan

[73] Assignee: Sony Corporation, Tokyo, Japan

[21] Appl. No.: 08/891,736

[22] Filed: Jul. 14, 1997

[30] Foreign Application Priority Data

Jul. 15, 1996  [JP]  Japan .................................. 8-204249

[51] Int. Cl.⁶ .................................................. G02F 1/1335
[52] U.S. Cl. ......................... 349/117; 349/165; 349/42; 349/43; 349/122
[58] Field of Search .................... 349/117, 165, 349/42, 43, 122

[56] References Cited

U.S. PATENT DOCUMENTS

| | | | |
|---|---|---|---|
| 5,499,124 | 3/1996 | Vu et al. ................................. | 359/59 |
| 5,568,294 | 10/1996 | Lee .............................................. | 359/73 |
| 5,592,318 | 1/1997 | Majima et al. ........................... | 349/122 |
| 5,742,368 | 4/1998 | Chen ......................................... | 349/117 |

*Primary Examiner*—Hung Xuan Dang
*Assistant Examiner*—Robert J. Hollingshead
*Attorney, Agent, or Firm*—Hill & Simpson

[57] ABSTRACT

A reflective guest-host liquid-crystal display includes: a pair of upper and lower substrates joined together with a predetermined space therebetween; and a guest-host liquid-crystal layer which is held within the space and contains a dichroic dye. The upper substrate is provided with at least a counter electrode. At least thin-film transistors (TFTs), a reflective layer, a λ/4 phase shifter (quarter-wavelength plate), and pixel electrodes are formed on the lower substrate. The λ/4 phase shifter is formed above the TFTs and the reflective layer, and has contact holes connecting to the drain electrodes of the TFTs. The pixel electrodes are patterned on the λ/4 phase shifter and connected to the corresponding drain electrodes of the TFTs through the corresponding contact holes.

16 Claims, 6 Drawing Sheets

ACTIVE MATRIX REFLECTIVE GUEST-HOST LCD WITH PIXEL ELECTRODES PATTERNED ON QUARTER WAVE PLATE

BACKGROUND OF THE INVENTION

1. Field of the Invention

The present invention relates to a reflective guest-host liquid-crystal display and a method for manufacturing the same. More particularly, the present invention relates to a technique for improving the utility efficiency of the incident light by providing a λ/4 phase shifter (quarter-wavelength plate) and a reflective layer within the display. More particularly, the present invention relates to a reflective guest-host liquid-crystal display prepared according to an active matrix structure with built-in switching devices for driving pixels, and a manufacturing method of the liquid-crystal display.

2. Description of the Related Art

FIG. 5 shows a cross-sectional structure of a reflective guest-host liquid-crystal display equipped with a λ/4 phase shifter and a reflective layer within the display disclosed in Japanese Patent Laid-Open No. 6-222351. A reflective guest-host liquid-crystal display 101 shown in the figure includes a pair of upper and lower substrates 102 and 103, a guest-host liquid-crystal 104, a dichroic dye 105, and a pair of upper and lower transparent electrodes 106 and 110, a pair of upper and lower alignment layers 107 and 111, a reflective layer 108, and a λ/4 phase shifter 109. The pair of upper and lower substrates 102 and 103 are composed of an insulating material such as glass, quartz, or plastic. At least the upper substrate 102 is transparent. The guest-host liquid-crystal 104 containing the dichroic dye 105 is held in a space formed between the pair of substrates 102 and 103. The guest-host liquid-crystal includes nematic liquid-crystal molecules 104a. The dichroic dye 105 is a so-called p-type dye having a transition dipole moment substantially parallel to the major axis of the liquid-crystal molecules 104a. Although not shown in the figure, switching devices are integratedly formed on the inner surface 102a of the upper substrate 102. The transparent electrode 106 is formed into a matrix pattern to form pixel electrodes and driven by the corresponding switching devices. Furthermore, the inner surface 102a of the upper substrate 102 is covered with the alignment layer 107 made of a polyimide resin or the like. The surface of the alignment layer 107 is, for example, rubbed to homogeneously align the nematic liquid-crystal molecules 104a, in other words, the liquid-crystal molecules 104a are aligned such that their major axis is parallel to the substrate surface.

Meanwhile, on the inner surface 103a of the lower substrate 103, a reflective layer 108 made of aluminum, etc. and the λ/4 phase shifter 109 composed of a polymer liquid-crystal, etc. are formed in that order. Moreover, the transparent electrode 110 and the alignment layer 111 are provided on the λ/4 phase shifter 109 in that order.

Operation for displaying an image in black and white mode in the above-described reflective guest-host liquid-crystal display 101 will be briefly explained below:

The nematic liquid-crystal molecules 104a, as well as the dichroic dye 105, are aligned homogeneously under no applied-voltage. When light coming from the side of the upper substrate 102 enters into the guest-host liquid-crystal 104, the dichroic dye 105 absorbs a light component whose oscillation face is parallel to the major axis of the dichroic dye 105. In addition, a light component whose oscillation face is perpendicular to the major axis of the dichroic dye 105 is transmitted through the guest-host liquid-crystal 104, circularly polarized by the λ/4 phase shifter 109 formed on the surface 103a of the lower substrate 103, and reflected by the reflective layer 108. The polarization direction of the light component is thereby reversed, and the reflected light component is retransmitted through the λ/4 phase shifter 109 and allowed to have an oscillation face parallel to the major axis of the dichroic dye 105. The polarized light component is absorbed into the dichroic dye 105, resulting in a substantially black image in the display. Meanwhile, under applied voltage, the nematic liquid-crystal molecules 104a, as well as the dichroic dye 105, are aligned perpendicular to the electric field direction. Light entering from the side of the upper substrate 102 is not absorbed into the dichroic dye 105, and is transmitted through the guest-host liquid-crystal layer 104 and reflected by the reflective layer 108 without being polarized by the λ/4 phase shifter 109. The reflected light is re-transmitted through the λ/4 phase shifter 109 and emerges from the guest-host liquid-crystal layer 104 without being absorbed into the dichroic dye 105, thereby resulting in a white image in the display.

However, according to the above-mentioned structure, switching devices are formed on the incident-side substrate. Since the switching devices are composed of thin-film transistors (hereinafter referred to as "TFTs") and the like, they cut off the incident light. The aperture ratio of pixels thereby disadvantageously decreases. FIG. 6 is a fragmentary sectional diagram showing a structure of a liquid-crystal display which is under development for overcoming the above problem of decreased aperture ratio and which has not yet been published as a prior art. In this liquid-crystal display, switching devices are integratedly formed on a reflection-side substrate. As is shown in the figure, a transparent counter electrode 203a is formed on the entire surface of an upper substrate 201, and a pixel electrode 204a is provided on a lower substrate 202 by dividing a reflective electrode into small portions according to a matrix shape. That is, this liquid-crystal display is an active matrix type. In addition to the pixel electrode 204a formed into a matrix pattern, a TFT corresponding to the individual pixel electrode 204a is integratedly formed on the inner surface of the substrate 202. The TFT is used as a switching device for driving the individual pixel electrode 204a. In other words, the "on/off" state of each TFT is selectively controlled to write a signal voltage in the corresponding pixel electrode 204a. A drain region D of the TFT connects to the pixel electrode 204a and a source region S connects to a signal line 221. A gate electrode G of the TFT connects to a gate line. Moreover, a storage capacitor Cs is formed corresponding to the pixel electrode 204a. By a planarization layer 222, the pixel electrode 204 is electrically separated from the TFT, the storage capacitor Cs, the signal line 221, and the like. Meanwhile, the transparent electrode 203a is formed on the entire inner surface of the upper substrate 201. The substrates 201 and 202 are in an opposed position at a predetermined distance while holding an electro-optical substance 205 therebetween. The electro-optical substance 205 has a laminated structure including a guest-host liquid-crystal 205 and a λ/4 phase shifter 207. The guest-host liquid-crystal 206 contains nematic liquid-crystal molecules 209 and a dichroic dye 208, and is homogeneously aligned by an upper alignment layer 210 and a lower alignment layer 211. The λ/4 phase shifter 207 is formed as a film along the pixel electrodes 204a.

When a signal voltage is written in the pixel electrode 204a, an electric field is generated between the pixel electrode 204a and the counter electrode 203a facing the pixel electrode 204a. The guest-host liquid-crystal 206 changes between the absorption state and the transmission state. Since such optical change occurs in each of the pixel electrodes 204, the desired image can be achieved in the display. The TFT, the storage capacitor Cs, the signal line 221, and the like are positioned under each of the pixel electrode 204. These components do not affect the pixel aperture rate because they do not stand in the incident-light path. In other words, the actual area of each pixel electrode 204a can be utilized as the pixel aperture, resulting in a bright image in the display.

However, in addition to the guest-host liquid-crystal 206, a plurality of layers are provided between the pixel electrode 204a and the counter electrode 203a in a structure shown in FIG. 6. Among such layers, the $\lambda/4$ phase shifter 207 is particularly thick. When a voltage is applied to the pixel electrode 204a, the polarization charge is concentrated in each interface between the above layers. Thus, a reverse electric field is generated in each interface, resulting in deteriorated image quality such as decreased contrast and after-image. Moreover, the effective voltage applied to the guest-host liquid-crystal 206 is disadvantageously reduced by providing a $\lambda/4$ phase shifter 207 on the pixel electrode 204a.

SUMMARY OF THE INVENTION

In view of the above-mentioned problems, the present invention provides a guest-host liquid-crystal display described below:

As a basic structure, a reflective guest-host liquid-crystal display includes: a pair of substrates joined together with a predetermined space therebetween; and a guest-host liquid-crystal which is held within the space and contains a dichroic dye. At least a counter electrode is formed on one substrate. On the other substrate, there are formed: switching devices; a reflective layer; a $\lambda/4$ phase shifter deposited above them and provided with contact holes connecting to the switching devices; and pixel electrodes patterned on the $\lambda/4$ phase shifter and connected to the corresponding switching devices via the corresponding contact holes. Preferably, the $\lambda/4$ phase shifter is a uniaxially aligned polymer liquid-crystal film. A planarization layer is formed to compensate for the roughness of the switching devices and the reflective layer. The $\lambda/4$ phase shifter is deposited on the surface of the planarization layer and the pixel electrodes connect to the corresponding switching devices via the corresponding contact holes penetrating the $\lambda/4$ phase shifter and the planarization layer. Preferably, the reflective layer is divided into portions in response to the individual pixel electrodes and each divided portion is connected to the corresponding pixel electrode at the same electric potential. The reflective layer has a scattering reflection face or it may have a mirror surface when a light-scattering layer is provided on the other substrate. More preferably, an alignment layer is formed to cover the surface of the pixel electrodes and in contact with the guest-host liquid-crystal so as to control the alignment thereof.

A reflective guest-host liquid-crystal display having the above-mentioned structure is manufactured according to the following steps incorporated in the present invention: Switching devices are integratedly formed on a first substrate in the first step. A reflective layer is prepared on the first substrate in the second step. A $\lambda/4$ phase shifter is formed above the switching devices and the reflective layer in the third step. In the fourth step, contact holes are made such that they penetrate the $\lambda/4$ phase shifter and connect to the corresponding switching devices positioned under the $\lambda/4$ phase shifter. Pixel electrodes connecting to the corresponding switching devices through the corresponding contact holes are formed on the $\lambda/4$ phase shifter in the fifth step. In the sixth step, a second substrate having a counter electrode thereon is joined with the first substrate with a predetermined space therebetween. Finally in the seventh step, a guest-host liquid-crystal containing a dichroic dye is poured into the space. Preferably, in the above third step, the $\lambda/4$ phase shifter is prepared such that after forming an alignment layer as an undercoat layer, a polymer liquid-crystal is applied to the alignment layer and uniaxially aligned. The above forth step includes: a photolithographic process in which a photosensitive film is applied to the surface of the $\lambda/4$ phase shifter and patterned by light-exposure and development; and an etching process for making contact holes by etching the $\lambda/4$ phase shifter using the patterned photosensitive film as a mask. A water-soluble photosensitive film not solubilizing the underlying $\lambda/4$ phase shifter is used in the photolithographic process. In the etching process, wet etching is carried out using an etching solution containing a solvent solubilizing the $\lambda/4$ phase shifter. Instead of wet-etching, dry-etching may be employed which is carried out by radiating oxygen plasma to make contact holes and simultaneously remove the disused mask by ashing.

According to the present invention, a $\lambda/4$ phase shifter is formed on the pixel electrodes. Therefore, except for the alignment layer, only the guest-host liquid-crystal exists between the pixel electrodes and the counter electrode, which fact permits the application of a sufficient electric field to the guest-host liquid-crystal. In addition, the pixel electrodes are electrically connected to the corresponding switching devices through the contact holes penetrating the $\lambda/4$ phase shifter.

DESCRIPTION OF THE PREFERRED EMBODIMENT

The present invention will be better understood from the following description of the preferred embodiment taken in conjunction with the accompanying drawings.

Figure 1:
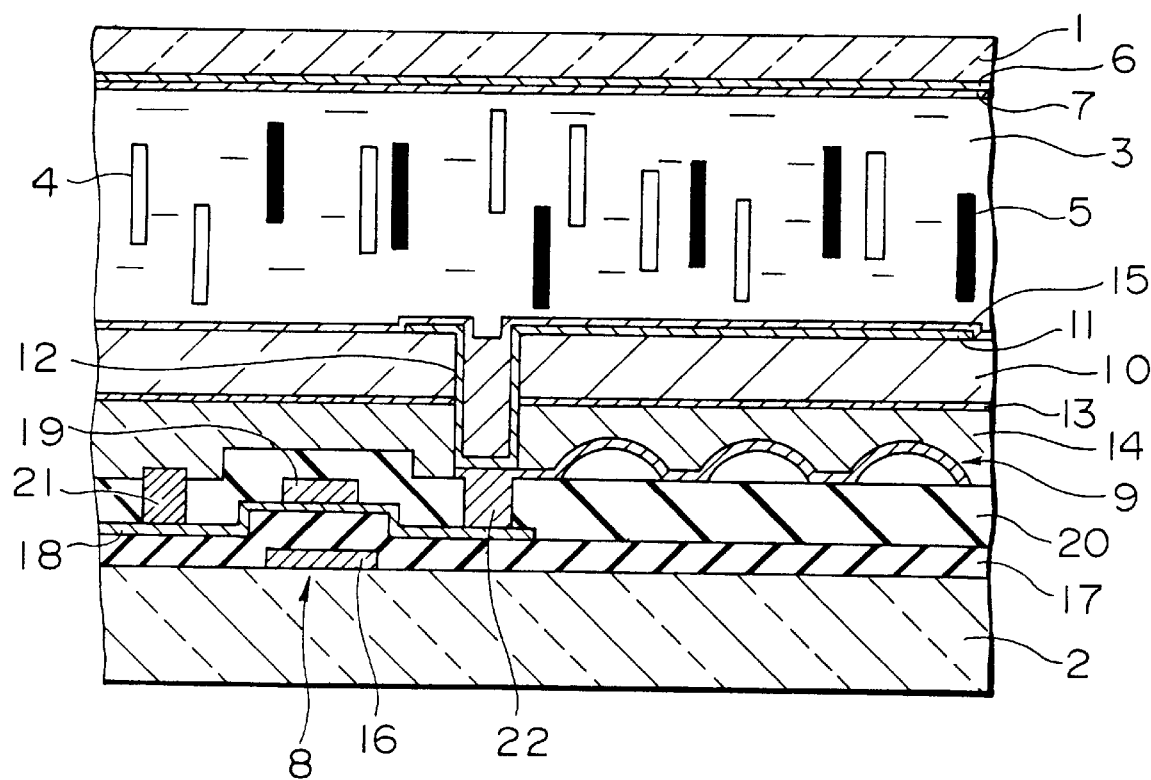
FIG. 1 is a fragmentary sectional diagram showing a basic structure of a reflective guest-host liquid-crystal display incorporated into the present invention.

FIG. 1 is a fragmentary sectional diagram showing a basic structure of a reflective guest-host liquid-crystal display incorporated into the present invention. The reflective guest-host liquid-crystal display is composed of a pair of an upper substrate 1 and a lower substrate 2 joined together with a predetermined space therebetween, as is shown in the figure.

Figure 5:
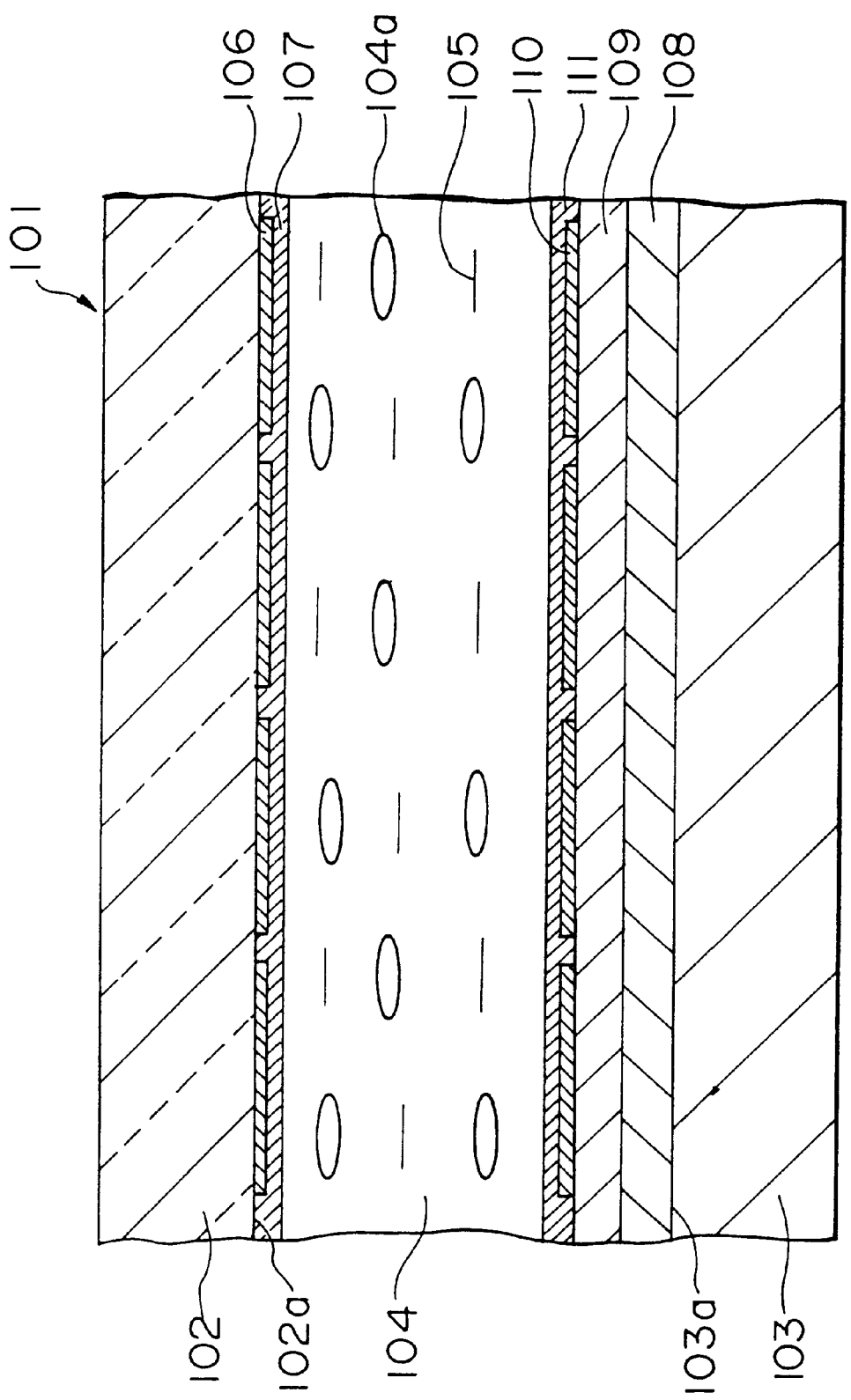
FIG. 5 is a fragmentary sectional diagram showing a conventional reflective guest-host liquid-crystal display.
Figure 6:
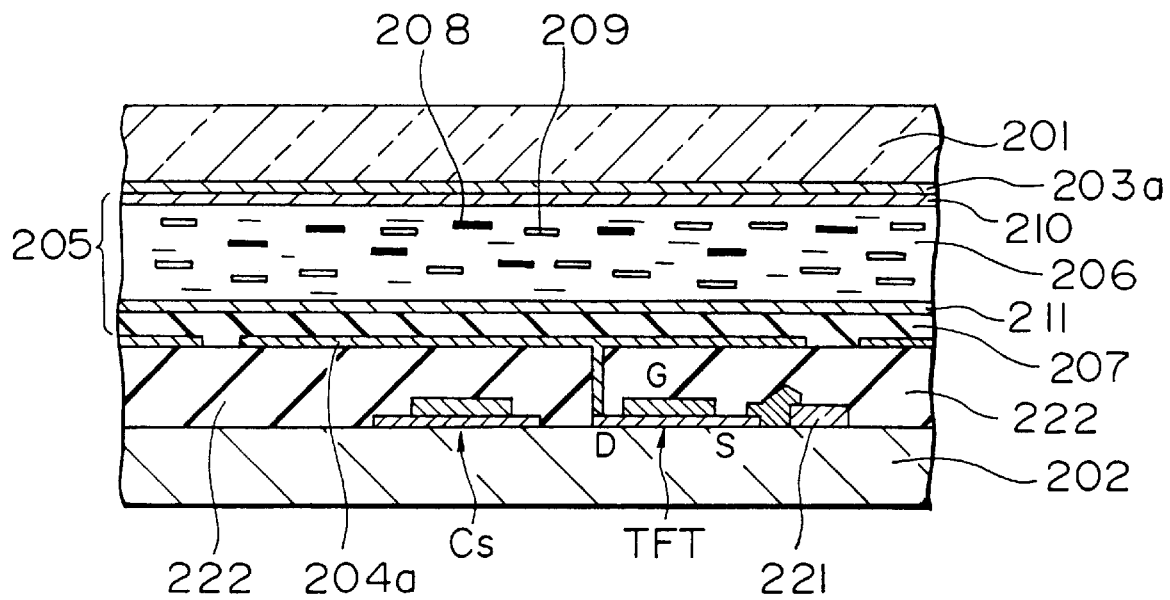
FIG. 6 is a fragmentary sectional diagram showing a reflective guest-host liquid-crystal display as a reference.

The upper substrate 1 is positioned at the incident side and made of a transparent material such as glass. The lower substrate 2 is located at the reflection side and does not always have to be composed of a transparent material. The pair of substrates 1 and 2 hold a guest-host liquid-crystal 3 therebetween. The guest-host liquid-crystal 3 is predominantly composed of nematic liquid-crystal molecules 4 having negative dielectric anisotropy and it also contains a dichroic dye 5 at a predetermined ratio. A counter electrode 6 and an alignment layer 7 are formed on the inner surface of the upper substrate 1. The counter electrode 6 is a transparent conductive film such as an ITO film. The alignment layer 7 is, for example, a polyimide film and it homeotropically aligns the guest-host liquid-crystal 3, in other words, the liquid-crystal molecules in the guest-host liquid-crystal 3 are aligned such that their major axis is perpendicular to the substrate surface. However, the present invention is not limited to the above construction and the guest-host liquid-crystal may be homogeneously oriented, as is shown in FIGS. 5 and 6. According to this embodiment, the guest-host liquid-crystal 3 is homeotropically aligned under no applied voltage, and homogeneously aligned under applied voltage.

At least a switching device composed of a TFT 8, a reflective layer 9, a λ/4 phase shifter 10, a pixel electrode 11 are formed on the lower substrate 2, as is shown in FIG. 1. As a basic structure, the λ/4 phase shifter 10 is formed above the TFT 8 and the reflective layer 9, and a contact hole 12 is made which penetrates these layers to the TFT 8. The pixel electrode 11 is patterned on the λ/4 phase shifter 10. Therefore, a sufficient electric field to be applied to the guest-host liquid-crystal 3 can be generated between the pixel electrode 11 and the counter electrode 6. The pixel electrode 11 electrically connects to the TFT 8 through the contact hole 12 penetrating the λ/4 phase shifter 10.

Each component will be described in detail below: In this embodiment, the λ/4 phase shifter 10 is composed of a uniaxially aligned polymer liquid-crystal film. An undercoat alignment layer 13 is employed for uniaxially aligning the polymer liquid-crystal film and is formed on the surface of a planarization layer 14 which covers the TFT 8 and the reflective layer 9 for compensating for the unevenness thereof. The λ/4 phase shifter 10 is also formed above the planarization layer 14. The pixel electrode 11 connects to the TFT 8 via the contact hole 12 penetrating both the λ/4 phase shifter 10 and the planarization layer 14. The reflective layer 9 separates into small portions in response to the individual pixel electrodes 11. Each small portion of the reflective layer 9 connects to the corresponding pixel electrode 11 at the same electric potential. Thus, no unnecessary electric field is applied to the λ/4 phase shifter 10 and the planarization layer 14, both of which are positioned between the portions and the pixel electrodes 11. As is shown in the figure, the reflective layer 9 has a scattering reflective surface to improve image quality by preventing mirror-reflection of the incident light. However, the reflective layer may have a mirror surface when a light-scattering layer is provided on the side of the substrate 1. An alignment layer 15 is formed to cover the surface of the pixel electrode 11 and is in contact with the guest-host liquid-crystal 3 so as to control the alignment thereof. In this embodiment, together with the opposed alignment layer 7, the alignment layer 15 homeotropically orients the guest-host liquid-crystal 3. The TFT 8 has a bottom-gate structure such that a gate electrode 16, a gate insulating film 17, and a semiconductor thin-film 18 are laminated from the bottom in the given order. The semiconductor thin-film 18 is made of polycrystalline silicon, etc.

The channel region matching the gate electrode 16 is protected by a stopper 19 positioned above the region. The TFT 8 having the above structure is coated with an interlayer insulating film 20. A pair of contact holes penetrate the interlayer insulating film 20 and, through the corresponding contact holes, a source electrode 21 and a drain electrode 22 electrically connect to the TFT 8. For example, the electrodes 21 and 22 are formed by patterning aluminum. The drain electrode 22 has the same electric potential as that of the reflective layer 9. The pixel electrode 11 electrically connects to the drain electrode 22 through the contact hole 12. A signal voltage is applied to the drain electrode 21.

Figure 2A:
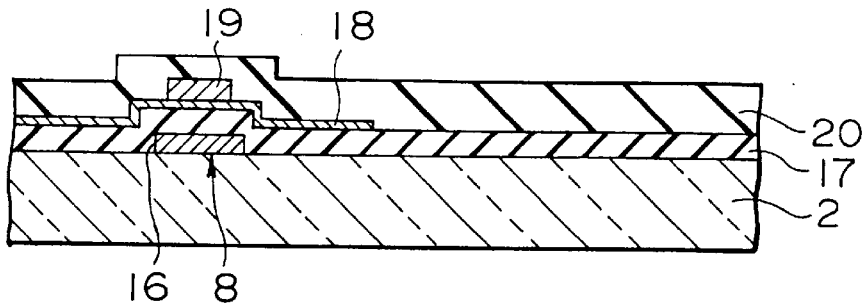
FIGS. 2A to 2D show manufacturing steps of a reflective guest-host liquid-crystal display incorporated into the present invention.

A method for manufacturing the reflective guest-host liquid-crystal display shown in FIG. 1 will be explained in detail with reference to the flow diagrams of FIGS. 2 to 4. First, a TFT is integratedly formed on the surface of an insulating substrate 2 in step A, as is shown in FIG. 2A. Practically, a metallic film having a high melting point is formed on the surface of the substrate 2 and then patterned into a predetermined shape so as to provide a gate electrode 16. A gate insulating film 17 covering the gate electrode 16 is formed by depositing silicon oxide or nitrogen oxide according to CVD or the like. On the gate insulating film 17, a semiconductor thin-film 18 composed of polycrystalline silicon, etc. is provided by CVD or the like. The semiconductor thin-film 18 is patterned into an island corresponding to the shape of the device region of the TFT 8. A stopper 19 is formed from silicon oxide, etc. on the semiconductor thin-film 18 and patterned to match the gate electrode 16. Using the resulting stopper 19 as a mask, impurities are injected onto the semiconductor thin-film 18 by ion-doping or ion-implantation. The TFT 8 of a bottom-gate structure is thereby obtained. An interlayer insulating film 20 is formed by depositing PSG, etc. to cover the TFT 8. The present invention is not restricted to the above construction and a TFT of a top-gate structure may be used as a switching device, instead of the TFT of a bottom-gate structure. Moreover, two-terminal devices such as MIM may be employed instead of the TFT.

Figure 2B:
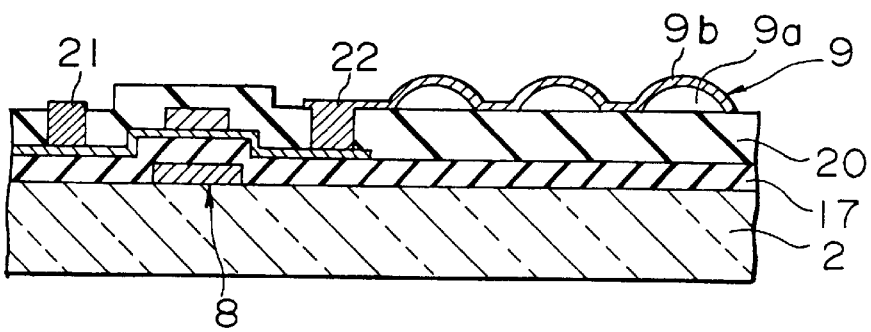

A reflective layer 9 is then prepared in the following step B, as is shown in FIG. 2B. The reflective layer 9 is composed of a roughened resin film 9a and a metallic film 9b (e. g., aluminum film) formed on the surface of the resin film 9a. The resin film 9a is a photosensitive-resin film unevenly patterned according to a photolithographic process. The resin film 9a is formed by applying a photoresist or the like over the entire surface of the interlayer insulating film 20. The resulting coating layer is subjected to light-exposure using a certain mask and then patterned into a cylindrical shape, etc. followed by heating for reflow. The resin film 9a having a roughened surface is thereby reliably prepared. The metallic film 9b having an excellent light reflectance and a desired thickness is formed on the resulting roughened surface. By setting the roughness to several $\mu$m deep, the reflective layer 9 can be whiten with excellent light scattering characteristics. In this embodiment, the metallic film 9b, a source electrode 21, and a drain electrode 22 are simultaneously formed by patterning as follows: a pair of contact holes penetrating the interlayer insulating film 20 are made after forming the roughened resin film 9a; aluminum is deposited on the entire surface of the interlayer insulating film 20 by sputtering or the like; and the resulting aluminum film is patterned into the metallic film 9b, the source electrode 21, and the drain electrode 22 simultaneously. As is apparent from the figure, the metallic film 9b has the same electric potential as that of the drain electrode 22.

Figure 2C:
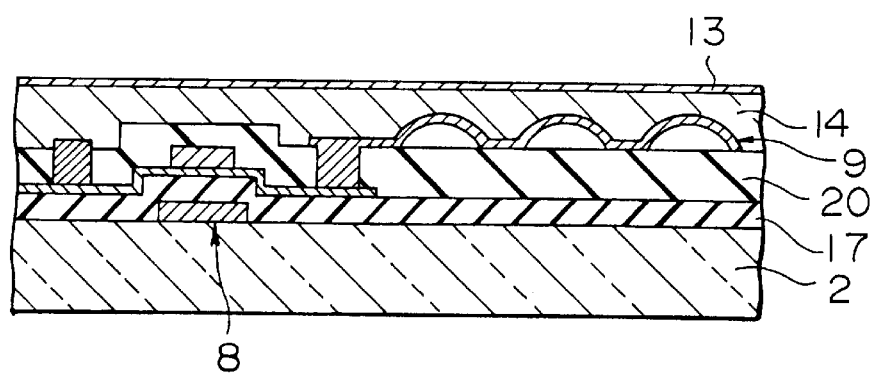

In the following step C shown in FIG. 2C, a planarization layer 14 is prepared on the reflective layer 9 to compensate for the roughness. It is preferable to use a transparent organic material, such as an acrylic resin, for the planarization layer 14. The planarization layer 14 is employed for the following reason: In the nest step D, a λ/4 phase shifter is prepared such that a polymer liquid-crystal is applied to an undercoat alignment layer 13 formed on the planarization layer 14 and then uniaxially aligned. By the use of the planarization layer 14, it becomes easier to reliably form and rub the undercoat alignment layer 13. Thus, the λ/4 phase shifter, which is one of the most important element of the present invention, can be prepared with accuracy. If the planarization layer 14 is not formed, the roughness of the reflective layer 9 directly affects the λ/4 phase shifter so that the desired characteristics cannot be attained. The undercoat alignment layer 13 is, for example, a polyimide film and is rubbed along a certain alignment direction. In some cases, the surface of the planarization layer 14 may be directly rubbed.

Figure 2D:
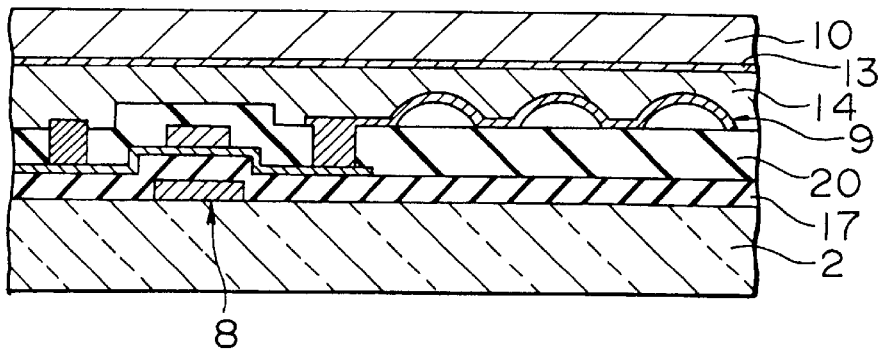

As is mentioned above, a λ/4 phase shifter 10 is prepared on the undercoat alignment layer 13 in step D, as is shown in FIG. 2D. In practice, a polymer liquid-crystal is applied to the undercoat alignment layer 13 to a predetermined thickness. The polymer liquid-crystal shows phase transition between the nematic liquid-crystal phase in a temperature range higher than a certain transition point and the solid phase (glass phase) in a temperature range lower than the transition point. For example, a main-chain or side-chain type polymer liquid-crystal which is in a glass state at room temperature and preferably has a transition point of not less than 100° C. can be employed. Optically, the polymer liquid-crystal is a transparent material having no absorption in the visible light region. The polymer liquid-crystal is dissolved in an organic solvent (e. g., a mixture of cyclohexane and n-butanone) and then applied to the surface of the undercoat orientation film 13 by spin-coating. Dipping, screen printing, or the like may be employed instead of spin-coating. The spin-coating conditions such as the concentration of the solution and the spinning rate are appropriately set so that the resulting film has a phase difference of λ/4 (λ is the wavelength of the incident light) in the visible light region. The substrate 2 is once heated above the transition point and then slowly cooled to room temperature, which is below the transition point. The polymer liquid-crystal is thereby oriented in a certain direction to provide the λ/4 phase shifter 10. For example, a polymer liquid-crystal material which has a transition point of not less than 100° C. and which has liquid-crystal molecules introduced in the main chains or side chains of the polymer is subjected to the above-described process of heating and slow-cooling. The liquid-crystal molecules of the polymer liquid-crystal are randomly aligned in the film-forming step, meanwhile they are oriented in the alignment direction after slow-cooling, resulting in the desired uniaxial optical anisotropy. In practice, the substrate 2 having a polymer liquid-crystal film thereon is heated in an oven preset to a temperature of the nematic or isotropic phase. The substrate 2 is then gradually cooled to room temperature. The coated polymer liquid-crystal is thereby oriented in the alignment direction of the undercoat alignment layer 13 which has been oriented beforehand.

Figure 3E:
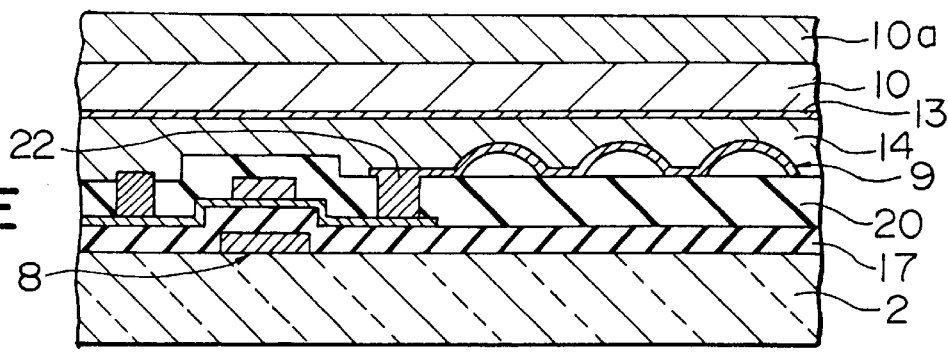
FIGS. 3E to 3H show manufacturing steps of a reflective guest-host liquid-crystal display incorporated into the present invention.

A contact hole is then made such that it penetrates the λ/4 phase shifter 10, the undercoat alignment layer 13, and the planarization layer 14 and connects to the drain electrode 22 of the TFT 8 positioned below these layers, as is shown in FIGS. 3E to 3H. First, a photosensitive film 10a is formed on the entire surface of the λ/4 phase shifter 10 in step E as shown in FIG. 3E. Preferably, the photosensitive film 10a is water-soluble so that it will not solubilize the underlying λ/4 phase shifter 10. When the λ/4 phase shifter 10, composed of a polymer liquid-crystal, etc., does not exhibit sufficient solvent resistance, it is damaged by applying a general-type photoresist, resulting in deteriorated patterning. The above problem is overcome by using a water-soluble photosensitive material such as PVA (polyvinyl alcohol) or PVA-SBQ for the photosensitive film 10a. In practice, a photosensitive material prepared by dissolving ammonium dichromate in PVA or a solution obtained by appropriately diluting PVA-SBQ (quaternary ammonium salt) with water is uniformly applied to the surface of the λ/4 phase shifter 10 using a spinner or the like. The substrate 2 is then subjected to baking in a vacuum or in the atmosphere at a temperature at which the optical anisotropy of the λ/4 phase shifter 10 can be maintained. When a general-type photoresist containing an organic solvent such as butyl acetate is employed, the λ/4 phase shifter 10 is possibly damaged. By such damage, the λ/4 phase shifter 10 is solubilized or in some cases cannot attain the desired optical anisotropy. Therefore, it is advantageous to use a water-soluble photosensitive film for patterning the λ/4 phase shifter 10, as is shown in this embodiment.

Figure 3F:
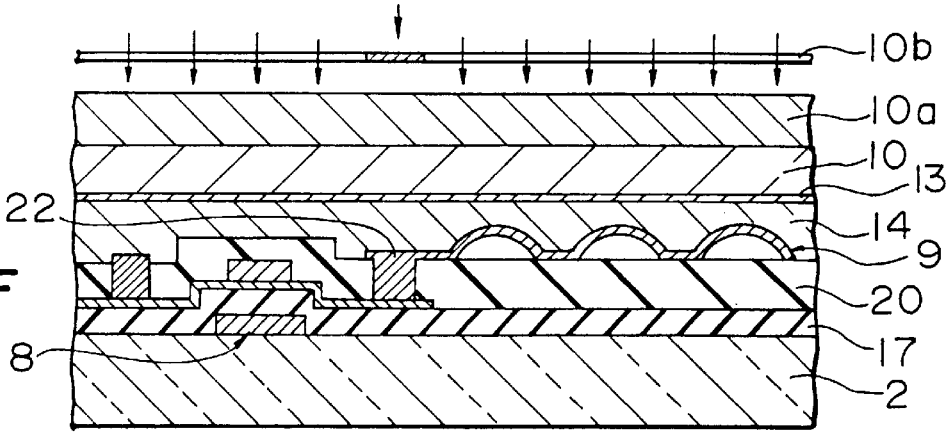

The photosensitive film 10a is then exposed to light in step F, as is shown in FIG. 3F. For example, when the photosensitive film 10a is exposed to light using a mask, the exposed portion hardens, meanwhile the unexposed portion remains unhardened. In other words, the water-soluble photosensitive film 10a used in this embodiment is a so-called positive type.

Figure 3G:
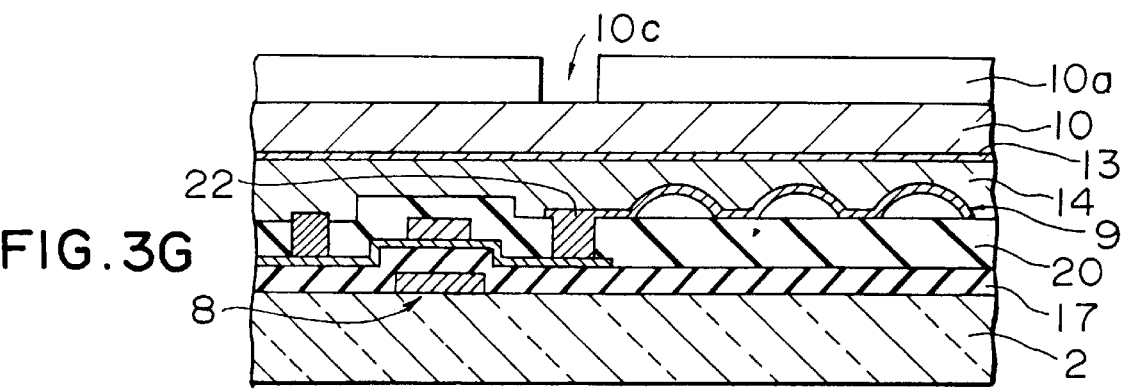

In the following step G shown in FIG. 3G, the unhardened portions are removed from the photosensitive film 10a by development using pure water or the like. According to such a photolithographic process, the photosensitive film 10a is patterned into a desired shape. In other words, a window 10c matching the drain electrode 22 is made in the photosensitive film 10a, as is shown in the figure.

Figure 3H:
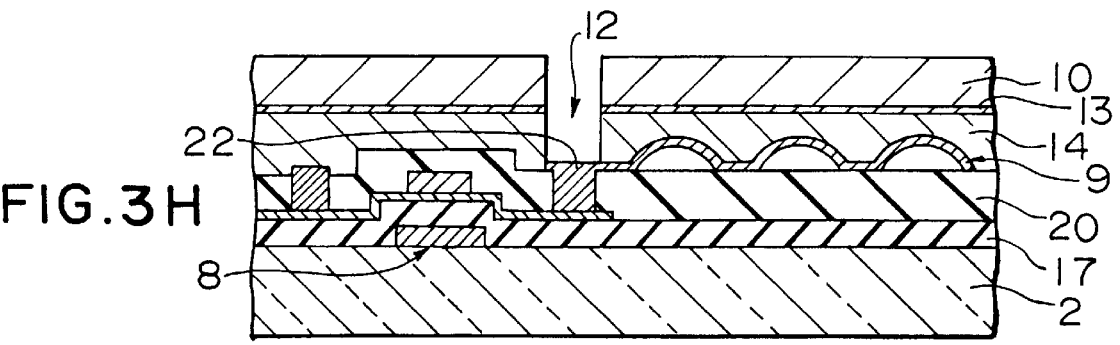

In step H shown in FIG. 3H, the λ/4 phase shifter 10, the undercoat alignment layer 13, and the planarization layer 14 are etched to make a contact hole 12 using the patterned photosensitive film 10a as a mask. This etching process can be carried out by dry-etching as follows: the above layers are etched by radiating oxygen plasma so that the disused mask can be removed by ashing simultaneously with making the contact hole 12. Assuming that the planarization layer 14 is omitted, the ashing rate of the water-soluble photosensitive film 10a, light-exposure and developed, and that of the λ/4 phase shifter 10 do not largely differ when the oxygen plasma is employed. Therefore, if the water-soluble photosensitive film 10a has substantially the same thickness as that of the λ/4 phase shifter 10, the disused water-soluble photosensitive film 10a can be removed by ashing for a certain period of time, simultaneously with making the contact hole 12. When the planarization layer 14 is formed, the thickness of the photosensitive film 10a is set considering the etching rate of the planarization layer 14. In some cases, wet-etching may be employed for making the contact hole 12, instead of dry-etching. Wet-etching is carried out using an etching solution containing a solvent solubilizing the λ/4 phase shifter 10 (and the planarization layer 14). If the planarization 14 is omitted, an etching solution is prepared by appropriately mixing a polar solvent solubilizing the λ/4 phase shifter 14 and a nonpolar solvent (poor solvent) not solubilizing the λ/4 phase shifter 14. As a polar solvent, an ester of acetic acid, dimethyl sulfoxide (DMSO), γ-butyrolactone, or n-methylpyrrolidone (NMP) can be used. As a nonpolar solvent, n-hexane or the like can be employed. The mixture ratio of the polar and the nonpolar solvents is set to a value providing a desired etching rate. For example, an approximately 1 μm-thick λ/4 phase shifter composed of a polymer liquid-crystal can be completely etched off by wet-etching for approximately 3 min. using an etching solution prepared by mixing ethyl acetate and n-hexane at a ratio of 10 to 1. Dry etching is more advantageous than wet-etching in that it exhibits less side-etching and can simultaneously remove the disused mask by ashing if conditions allows. Although the contact hole 12 penetrating both the λ/4 phase shifter 10 and,the planarization layer 14 is made in the above etching process, the present invention is not limited to such a case. The drain electrode 22 may be formed beforehand by patterning on the planarization layer 14. In this case, the contact hole 12 is required to penetrate only the λ/4 phase shifter 10, thereby providing a wider degree of freedom for the etching conditions.

Figure 4I:
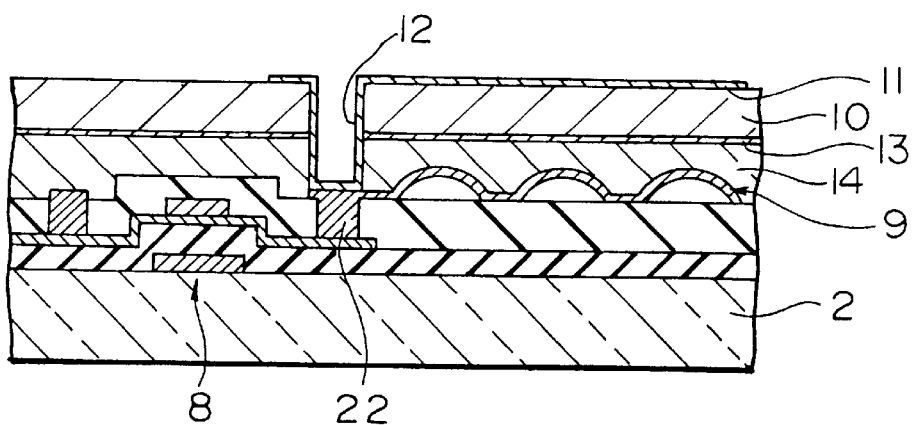
FIGS. 4I to 4K show manufacturing steps of a reflective guest-host liquid-crystal display incorporated into the present invention.

In the following step I shown in FIG. 4I, a pixel electrode 11 is formed on the λ/4 phase shifter 10 such that it connects to the drain electrode 22 of the TFT 8 via the contact hole 12. For example, the pixel electrode 11 can be prepared as follows: a transparent conductive film made of ITO or the like is formed by sputtering and patterned into a predetermined shape by etching. Since a water-soluble etching solution can be employed for etching the pixel electrode 11, the underlying λ/4 phase shifter 10 is not damaged.

Figure 4J:
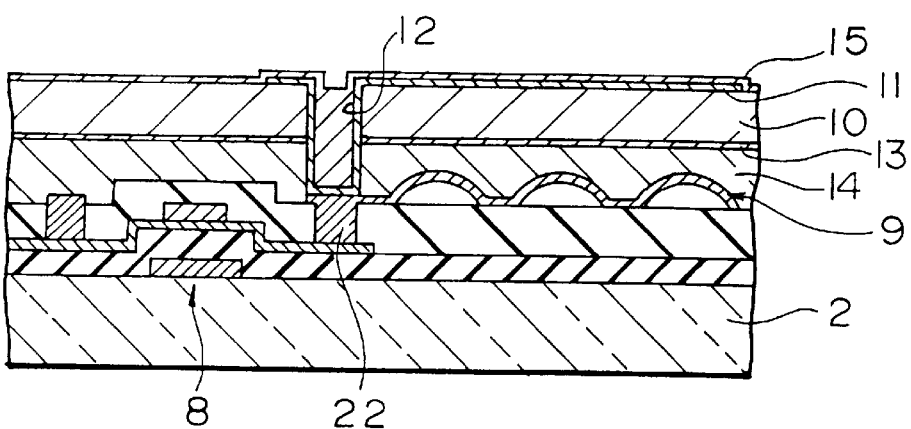

An alignment layer 15 covering the pixel electrode 11 is then formed in step J shown in FIG. 4J. For example, the desired alignment layer 15 can be prepared by forming a polyimide film for homeotropic alignment.

Figure 4K:
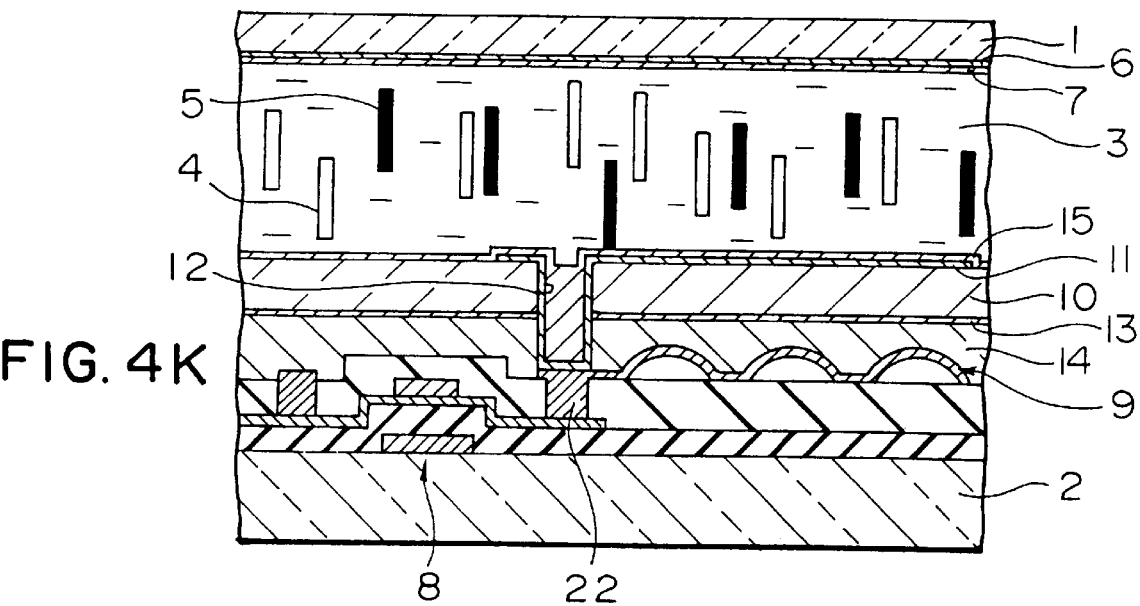

Finally, in step K shown in FIG. 4K, a transparent substrate 1 on which a counter electrode 6 and an alignment layer 7 have been formed is joined with the insulating substrate 2 with a predetermined space between the substrates 1 and 2. A guest-host liquid-crystal 3 containing a dichroic dye 5 is poured into the space between the substrates 1 and 2 to complete a reflective guest-host liquid-crystal display.

As is described in the above, according to a reflective guest-host liquid-crystal display of the present invention, pixel electrodes are patterned on a λ/4 phase shifter and, via the corresponding contact holes, connected to the corresponding switching devices individually composed of TFTs and the like. By employing such a structure, sufficient voltage can be applied to a guest-host liquid-crystal held between a counter electrode and the pixel electrodes, thereby permitting high-contrast images in the display. In addition, except for an alignment layer, layers composed of organic materials do not exist between the pixel electrodes and the counter electrode. Thus the polarization charge in each interface in the electric field is reduced. Deterioration in image quality is thereby prevented so that higher reliability is achieved in the reflective guest-host liquid-crystal display.

What is claimed is:

1. A reflective guest-host liquid-crystal display comprising:
    a first substrate and a second substrate joined together with a predetermined space therebetween;
    a liquid-crystal layer held within said space;
    a counter electrode formed on an inner face of said first substrate;
    a plurality of switching devices and a reflective layer both formed over said second substrate;
    a λ/4 phase shifter deposited above said reflective layer, said λ/4 phase shifter comprising a plurality of contact holes connecting to said corresponding switching devices; and
    a plurality of pixel electrodes patterned on said λ/4 phase shifter connecting to said corresponding switching devices via said corresponding contact holes.

2. A reflective guest-host liquid-crystal display as set forth in claim 1,
    wherein said λ/4 phase shifter is composed of a uniaxially aligned polymer liquid-crystal film.

3. A reflective guest-host liquid-crystal display as set forth in claim 1 further comprising a planarization layer to compensate for the roughness of said switching devices and said reflective layer.

4. A reflective guest-host liquid-crystal display as set forth in claim 3,
    wherein said λ/4 phase shifter is deposited on the surface of said planarization layer, and said pixel electrodes connect to said corresponding switching devices via said corresponding contact holes penetrating said λ/4 phase shifter and said planarization layer.

5. A reflective guest-host liquid-crystal display as set forth in claim 1,
    wherein said reflective layer is divided into portions in response to said individual pixel electrodes.

6. A reflective guest-host liquid-crystal display as set forth in claim 5,
    wherein each divided portion of said reflected layer is connected to said corresponding pixel electrode at the same electric potential.

7. A reflective guest-host liquid-crystal display as set forth in claim 1,
    wherein said reflective layer has a scattering reflection face.

8. A reflective guest-host liquid-crystal display as set forth in claim 1,
    wherein each of said pixel electrodes is covered with an alignment layer in contact with said guest-host liquid-crystal layer so as to align the liquid-crystal.

9. A reflective guest-host liquid-crystal display as set forth in claim 1,
    wherein said guest-host liquid-crystal layer is homogeneously aligned, in other words, liquid-crystal molecules contained in said guest-host liquid-crystal are aligned such that the major axis thereof is parallel to the substrate surface.

10. A reflective guest-host liquid-crystal display as set forth in claim 1,
    wherein said guest-host liquid-crystal layer is homeotropically aligned, in other words, liquid-crystal molecules contained in said guest-host liquid-crystal are aligned such that the major axis thereof is perpendicular to the substrate surface.

11. A method for manufacturing a reflective guest-host liquid-crystal display comprising:
    a step for integratedly forming a switching device on a first substrate;
    a step for forming a reflective layer over said first substrate;
    a step for forming a λ/4 phase shifter over said switching device and said reflective layer;
    a step for making a contact hole in said λ/4 phase shifter, said pixel electrode connecting to said switching device through said contact hole;
    a step for joining a second substrate having a counter electrode thereon with said first substrate with a predetermined space therebetween; and
    a step for pouring into said space a liquid-crystal.

12. A method for manufacturing a reflective guest-host liquid-crystal display as set forth in claim 11, wherein said step for forming said $\lambda/4$ phase shifter is carried out such that after forming an alignment layer as an undercoat layer, a polymer liquid-crystal is applied to said alignment layer and uniaxially aligned.

13. A method for manufacturing a reflective guest-host liquid-crystal display as set forth in claim 11, wherein said step for making said contact hole comprises: a photolithographic process in which a photosensitive film is applied to the surface of said $\lambda/4$ phase shifter and patterned by exposure and development; and an etching process for making a contact hole by etching said patterned $\lambda/4$ phase shifter using said photosensitive film as a mask.

14. A method for manufacturing a reflective guest-host liquid-crystal display as set forth in claim 13, wherein a water-soluble photosensitive film not solubilizing said underlying $\lambda/4$ phase shifter is used in said photolithographic process.

15. A method for manufacturing a reflective guest-host liquid-crystal display as set forth in claim 13, wherein wet-etching is carried out using an etching solution containing a solvent solubilizing said $\lambda/4$ phase shifter in said etching process.

16. A method for manufacturing a reflective guest-host liquid-crystal display as set forth in claim 13, wherein dry-etching is carried out by radiating oxygen plasma so as to make a contact hole and simultaneously removing the disused mask in said etching process.

\* \* \* \* \*